(12) United States Patent
Masiero et al.

(10) Patent No.: US 8,648,683 B2
(45) Date of Patent: Feb. 11, 2014

(54) MOLD FOR MAKING PRODUCTS WITH CO-MOLDED INSERTS

(76) Inventors: Mauro Masiero, Polverara (IT); Antonio Sgaravatti, Montegrotto Terme (IT)

( * ) Notice: Subject to any disclaimer, the term of this patent is extended or adjusted under 35 U.S.C. 154(b) by 0 days.

(21) Appl. No.: 13/697,355

(22) PCT Filed: May 10, 2011

(86) PCT No.: PCT/IB2011/052043
§ 371 (c)(1),
(2), (4) Date: Nov. 10, 2012

(87) PCT Pub. No.: WO2011/141865
PCT Pub. Date: Nov. 17, 2011

(65) Prior Publication Data
US 2013/0057373 A1     Mar. 7, 2013

(30) Foreign Application Priority Data
May 11, 2010 (IT) .............................. PD2010A0149

(51) Int. Cl.
*H01F 7/02* (2006.01)

(52) U.S. Cl.
USPC .......................................................... 335/302

(58) Field of Classification Search
USPC .................................................. 335/302–306
See application file for complete search history.

(56) References Cited

U.S. PATENT DOCUMENTS

| 4,935,174 | A | | 6/1990 | Suzuki | |
|---|---|---|---|---|---|
| 6,071,357 | A | * | 6/2000 | Guruswamy et al. | 148/301 |
| 6,317,020 | B1 | * | 11/2001 | Nakagawa et al. | 335/302 |
| 6,660,566 | B2 | * | 12/2003 | Masayuki | 438/124 |
| 2007/0267771 | A1 | | 11/2007 | Earnest | |
| 2013/0049187 | A1 | * | 2/2013 | Minamio et al. | 257/712 |

FOREIGN PATENT DOCUMENTS

| DE | 2008005356 | 5/2009 |
|---|---|---|
| JP | 62152824 | 7/1987 |
| JP | 6091657 | 4/1994 |
| WO | 2008036778 | 3/2008 |

* cited by examiner

*Primary Examiner* — Bernard Rojas
(74) *Attorney, Agent, or Firm* — QuickPatents; Kevin Prince

(57) ABSTRACT

A molding system with inserts placed on the die and/or the punch of the mold, which allows one to obtain molded products with co-molded ferromagnetic inserts on the surfaces thereof.

12 Claims, 3 Drawing Sheets

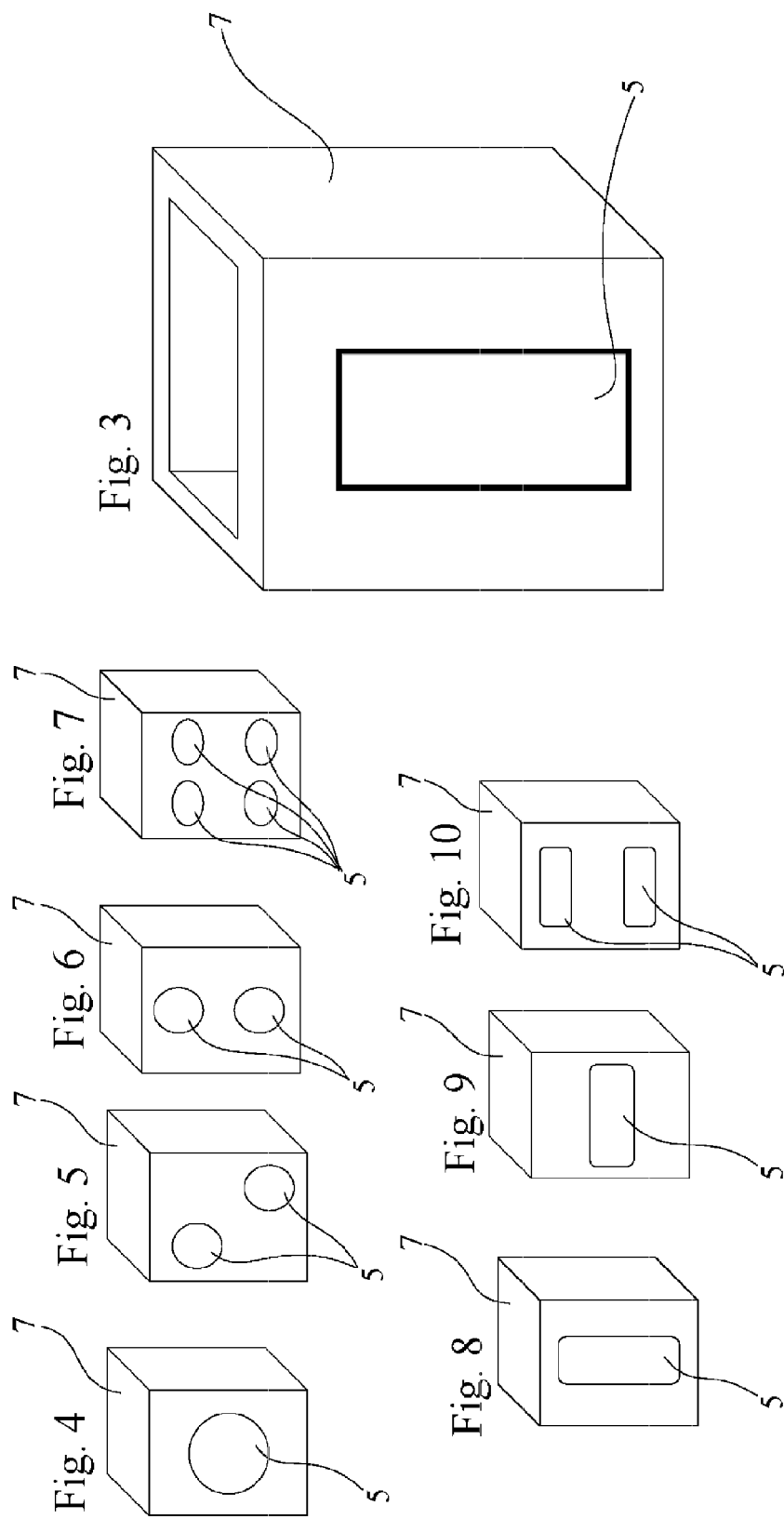

MOLD FOR MAKING PRODUCTS WITH CO-MOLDED INSERTS

CROSS-REFERENCE TO RELATED APPLICATIONS

This application claims the benefit of Italian Patent Application PD2010A000149, filed on May 11, 2010, and PCT Application PCT/IB2011/052043, filed on May 10, 2011, both incorporated herein by reference.

FIELD OF THE INVENTION

The object of this patent application concerns a molding system with inserts and related product obtained thereby.

DISCUSSION OF RELATED ART

In the field of molding there is a consolidated and well-known method for making molded plastic products, and equally well-known and consolidated is the realization of the relative molds composed of a female die and a male punch. The methods for making a mold are conditioned above all by the costs for making the relative dies, the desire to obtain a pre-set speed for making the products obtained, with a minimum cost of the material used, but with a high quality finish of the products obtained, without there being any evident shrinking and/or deformations. Therefore the realization of products using molds with simple shapes, without any undercuts, is well-known and consolidated.

In the pursuit of relatively new forms, less costly but at the same time more reliable and with a more defined and precise finish, we have the invention which is the object of this patent application. Indeed, when it is necessary to make a die with an undercut, a hollow, like for example a hole, with axes perpendicular to the axes of the movement of the die or the main punch, a cart with relative insert is required. It is evident that such further movement makes the mold more expensive, the removal of the product from the mold slower, and results in a more expensive product. These undercuts and hollows are, however, necessary in the case where a complementary housing for small inserts has to be made, which are inserted into the housings after molding.

Moreover, in addition to the drawbacks set out above, there is also the encumbrance of a successive handling of the product with the insertion, usually manually, of the insert into the specially made housing and the relative fixing, usually using glues. In fact, a dovetail insertion provides no guarantee of a secure seal, something that only specific glues can ensure.

There remains, then, the unresolved issue of an application to the rear of the mold. It is evident that, in the pursuit of ever greater cost-effectiveness, these above-mentioned drawbacks tend to be reduced to a minimum: avoiding the use of inserts in the mold, designing them eventually without any undercuts, creating elements to be inserted that do not have complex forms, with a simple edge, that provide a speedy insertion into the relative housings and by using reliable, non-toxic glues, etc.

For some time now it has been possible to overcome the above-mentioned difficulties and drawbacks with the co-molding of small inserts within the profile of the main products molded. Nevertheless, this co-pressing is complicated and requires expensive molds and equipment.

In the case where simple inserts need to be inserted before the molding, numerous other difficulties arise, in addition to those mentioned above. The main limitation lies in the fact that it is difficult to hold and correctly position these small inserts. Up until today it has not been possible to overcome such difficulties for all types of inserts, especially regarding metallic inserts, whose weight makes them difficult to be restrained, it not being possible to guarantee a defined position, and the precision of the continuous edges and flush with the same surfaces in the profile of the main product being molded. It is clear that if these metallic inserts need to be present on the vertical surfaces, their positioning and precise restraint is difficult to achieve. Also the rotational molding technology is influenced by one or more of the drawbacks mentioned above.

Recently these drawbacks have been partially overcome through the installation of magnets in the male punch or in the female die that hold the above-mentioned metallic inserts. Nevertheless, this method cannot be reversible, with the co-molding of magnetic inserts, since during the operations to remove the products just molded, and still warm, the magnetic insert is forced to follow the movement of the steel mold. This drawback is especially serious in the molding of thin goods, since the material just molded, and still warm, provides minimum resistance, and in any event not enough for the uncontrolled and unwanted movement of the co-molded magnet.

SUMMARY OF THE INVENTION

Technical Problem

The purpose of this patent is to succeed in co-molding plastic objects with magnetic inserts, without the above-mentioned drawbacks and those that will become clear further on in the description.

Technical Solution

It has to do with fitting out the female die or the male punch of a mold with one or more metallic inserts that at least hold an insert to be co-pressed of a magnetic material in the profile of the molded product obtained from said mold using magnetic force.

Advantageous Effects

Advantageously said metallic inserts are positioned inside the profile of the female die or male punch in such a way that sufficient attraction is provided, and the magnetic insert to be co-pressed is restrained in every cycle of the process; thereby providing the precise and secure application of said insert to be co-pressed, providing a secure closing of the mold, maintaining the position of the insert to be co-molded during the entire time the plastic material is injected, ensuring a reliable removal of the product and permitting the final extraction of the molded product itself.

A further advantage of the object of the invention lies in being able to arrange beforehand the positioning of the insert to be co-molded held on the female die or the male punch, thereby increasing the flexibility of the production.

Another advantage consists of the absence of maintenance for the retention devices (inserts associated with one of the parts of the mold), these not being subject to wear.

It is also quite easy to insert and size, also once the female die or the male punch has been made, any additional inserts.

This invention also allows you to easily co-mold said magnetic inserts in positions that would otherwise be complicated or impossible to realize, for example on edges and/or undercuts that would not permit a simple positioning of a ram for a punch.

This application also lends itself in particular to the application of magnetic inserts to be co-molded with the provision that the material of at least one of the parts that make up the mold (die, punch) is made with non-magnetic material, like for example aluminum.

With the above-mentioned application it is possible therefore to obtain goods or products with a co-molded magnetic insert flush with the outer surface or incorporated into the outer perimeter profile. This product, with an eventual co-molded magnetic insert positioned on the surface would be flush, and therefore maintaining a smooth and even surface, eliminating differences of thickness between the support and the co-molded magnetic insert. With these inserts associated with at least one part of the mold there is also the advantage of succeeding in co-molding, in a simple, inexpensive, secure and precise manner a co-molded magnetic insert that will never be subject to detachment, which has no cracks and/or discontinuity along the edges with respect to the support, which is (if underlying) not visible, giving the object a perfect waterproof seal, guaranteed by the continuity of the outer plastic support.

Equally, by using the invention that is the object of this patent application in the rotational mold it is possible to obtain one or more of the above-mentioned advantages with the application of the special metallic inserts on the mold (die) that by force of attraction hold the magnetic inserts to be co-molded on the perimeter surface. It is clear that it is necessary that the insert associated with the mold is metal and that the insert to be co-molded is a magnet. By using the above-mentioned method of co-molding magnetic inserts, you can meet another requirement of realizing molded objects, whose magnet is suspended on a metallic wall or part of it. In fact, even if the co-molded magnetic insert can provide reasonable tensile strength, perpendicular to the suspension surface, it exercises a moderate resistance to sliding along it. This sliding, moreover, especially if the metallic surface has a polished surface finish, and the magnet is flush with the molded product, risks scratching/scraping the surface with unsightly and unacceptable lines.

It is clear that the application of a small felt pad applied using glue on the back, cannot fully resolve the problem since it does not guarantee durability, and a planar application, etc. Moreover a small felt pad creates a sizeable gap, with a consequent reduction in the attractive power of the co-molded magnet with respect to the metallic surface.

Advantageously, the positioning of an underlying magnet allows you to avoid this scratching and streaking of the metallic surface. With this above-mentioned positioning the gap between the magnet and the metallic surface of the application will be very small, and does not significantly reduce the attraction force of the magnet, thereby ensuring a good hold against detachment of the co-molded product with respect to the metallic surface. A further advantage of this underlying positioning consists of the adoption of a co-molded material, or non-slip attached piece, that prevents the co-molded product sliding along the surface of the metallic wall. This non-slip material can be any thermoplastic material and/or that can be joined to the base material of the product, and which has, at room temperature, a reasonable grip on the metallic surfaces, in such a way as to prevent any sliding along the metallic surface of the co-molded product. Advantageously, the use of a metallic sheet placed next to the magnet on the surface opposite that placed near the internal or external profile of the product, allows the lines of magnetic force to be concentrated, and to increase the magnetic attraction with respect to the metallic surface. The methods for co-molding have not been altered, with respect to the adoption of just a single magnet, with the addition of this above-mentioned metallic sheet. This expediency, in addition to the above-mentioned benefits, also allows the space in front of the product to be shielded from undesired magnetic fields, it being possible therefore also to use objects that are sensitive to magnetic fields without any danger of the demagnetization of credit cards, the stopping of watches and medical devices, etc.

Another object of this patent concerns the product molded with a co-molded ferromagnetic insert. Preferably, said co-molded insert is magnetized, and conveniently put near at least one outer perimeter surface.

Advantageously the molded product with a co-molded ferromagnetic insert is directly obtained using the above-mentioned molds.

Advantageously, the above-mentioned co-molded insert has at least one perimetric holding edge with an inclination or configuration that joins it solidly to the molded product and held against any actions or forces that might tend to detach it from the support of the molded product.

Advantageously, the molded product has an underlying magnet.

Another advantage of the molded product is that it has at least in the surface, or part of it, of the side near where the magnetic insert is situated, a non-slip material that prevents any sliding along the metallic surface, the magnetic force being sufficient to provide the necessary resistance to any detachment perpendicular to the surface.

Another benefit of the molded product is that is possesses, next to the magnet on the side opposite to that near the surface, a metallic sheet for concentrating the lines of magnetic force, and increasing the magnetic attraction with regard to the joined metallic surface; and this metallic sheet shields the gap between the molded product from unwanted magnetic fields.

DESCRIPTION OF THE DRAWINGS

By way of example and in no way limiting, the following diagrams show a preferred method with reference to the application of a magnetic insert to be co-molded where the above-mentioned advantages can be seen more clearly and where it is possible to understand further benefits, methods and/or effects.

FIG. 3 shows the product of invention with co-molded inserts; and

FIGS. 4 to 10 show different possible ways of positioning one or more magnetic inserts.

DETAILED DESCRIPTION OF THE PREFERRED EMBODIMENT

Figure 1:
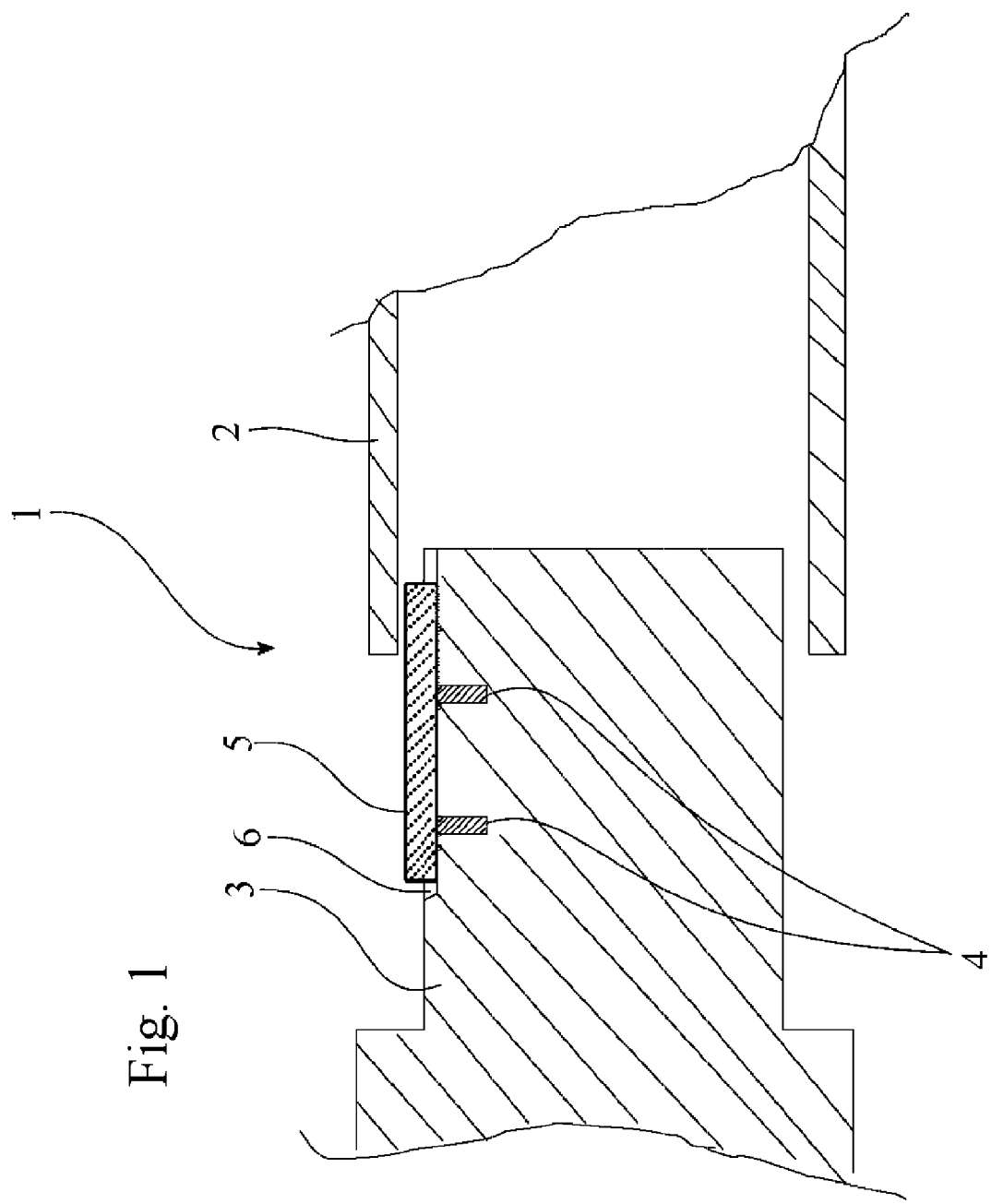
FIG. 1 shows the invention with reference to a magnetic insert applied to a male punch in the mold closing phase.
Figure 2:
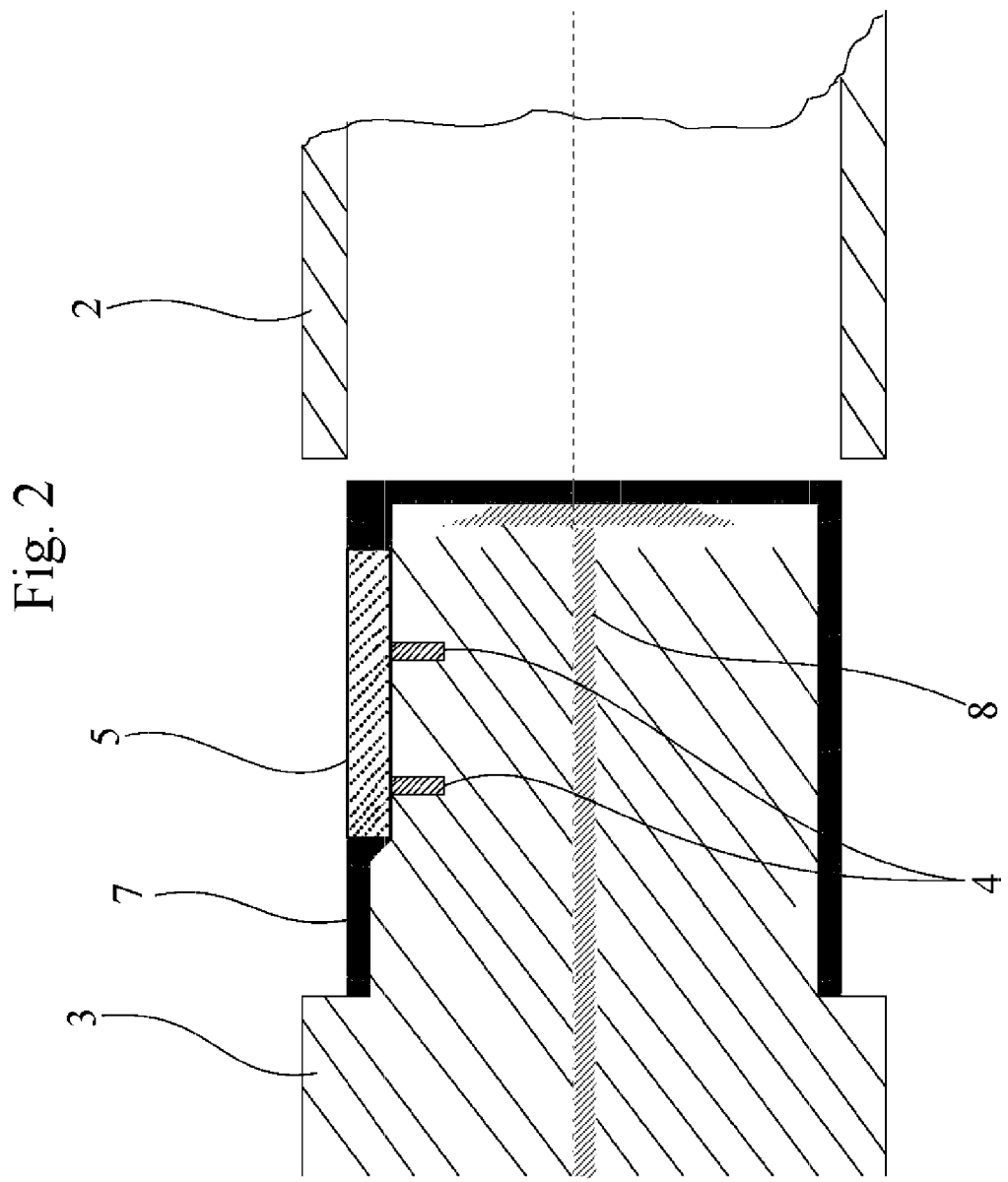
FIG. 2 shows the object made with a co-molded magnetic insert in the mold opening phase.

The application described in FIGS. 1 and 2 refer to a mold 1 made of a non-ferromagnetic material for the application of a magnetic insert to be co-molded. In particular we can note a longitudinal section of the male punch 3, the presence of two sunken areas inside which the metallic inserts 4 are inserted that hold the magnetic insert 5 to be co-molded. The positioning of the magnetic insert to be co-molded 5 takes place with the mold 1 open.

In the case in question, on the male punch 3 around the magnetic insert 5 to be co-molded there is a suitable sunken housing 6 for completely surrounding the lateral perimeter of the magnetic insert 5 to be co-molded in the injection resin and to provide an easier extraction later, without the insert to be co-molded 5 being subject to sudden shifts in its position. After the correct positioning of the magnetic insert 5 to be co-molded on the male punch 3, said male punch 3, with the magnetic insert 5 to be co-molded held by the metallic inserts in the hollows realized in the body of said male punch 3, is moved into position inside the female die 2 for the injection of the plastic material. The plastic material fully surrounds the magnetic co-molded insert 5 along the perimeter edges, securely holding the co-molded insert itself in the molded product 7.

It should be noted that the positioning of said insert 5 to be co-molded is securely held during the entire injection phase. Once the cooling phase of the molded product 7 is complete it is removed with the help of an extractor 8 overcoming the resistance posed by the magnetic forces between the co-molded magnetic insert 5 and the metallic inserts 4. When the mold 1 is open, the male punch 3 is free and ready for a successive molding cycle.

FIG. 3 shows the molded product 7 with a flush co-molded insert 5 on a face.

FIGS. 4 to 10 show, by way of example, the flexible possibility of locating the co-molded inserts 5, where the precision of the positioning with respect to the edges of the molded product 7 can be immediately seen.

What is claimed is:

1. A mold for making products with co-molded inserts including at least a die and at least a punch, characterized by the fact that:
   - on at least one of said die and said punch, there are one or more metallic inserts that are capable of retaining one or more magnetic inserts for co-molding at least during the molding stage of the molded product;
   - at least one of said die and said punch are made of a diamagnetic material; and
   - said one or more metallic inserts to be co-molded are arranged flush with an outer surface of the molded product inside a hollow or undercut with an axis perpendicular to a movement axis of the die or the punch.

2. The mold for making products with co-molded inserts according to claim 1, characterized by the fact that at least one of said dies and/or at least one punch are made of aluminum.

3. The mold for making products with co-molded inserts according to claim 1, characterized by the fact that said metallic inserts for retaining the inserts to be co-molded are placed inside one or more hollows and/or grooves made in at least one of said dies and/or in at least one of said punches.

4. The mold for making products with co-molded inserts according to claim 1, characterized by the fact that said co-molded inserts are positioned in line with the outside surfaces of the product, flush between its edges and their retention surfaces.

5. The mold for making products with co-molded inserts according to claim 1, characterized by the fact that said co-molded inserts are positioned underneath the profile of the surfaces of the product and covered on the surface by the material, thereby invisible on the outside and with a hydraulic guard.

6. The mold for making products with co-molded inserts according to claim 1, characterized by the fact that said co-molded inserts are flush with the profile of the outer and/or inner surface of the molded product.

7. The mold for making products with co-molded inserts according to claim 1, characterized by the fact that the mold is a rotational die and said inserts are joined to the die.

8. A molded product including at least one insert positioned on one of its surfaces, characterized by the fact that said insert is made of a magnetic material, co-molded and retained inside the profile of an outside perimeter surface of said molded product, and wherein the molded product is made by a mold according to claim 1.

9. The molded product according to claim 8, characterized by the fact that said insert is placed below the profile of an outer perimeter surface of said molded product.

10. The molded product according to claim 8 or 9, characterized by the fact that the surface of the side or part of it, near which said insert is placed, has non-slip properties with respect to an element for which the magnet exercises its magnetic force of attraction.

11. The molded product according to claim 10, characterized by the fact that said surface, or part of it, with non-slip properties is co-molded or a coating carried out later during the molding.

12. The molded product according to claim 8, characterized by the fact that adhering to the magnet, and co-molded with it, there is a metallic sheet on the side of the magnet opposite that near the surface of the molded product.

* * * * *